United States Patent Office 3,806,422
Patented Apr. 23, 1974

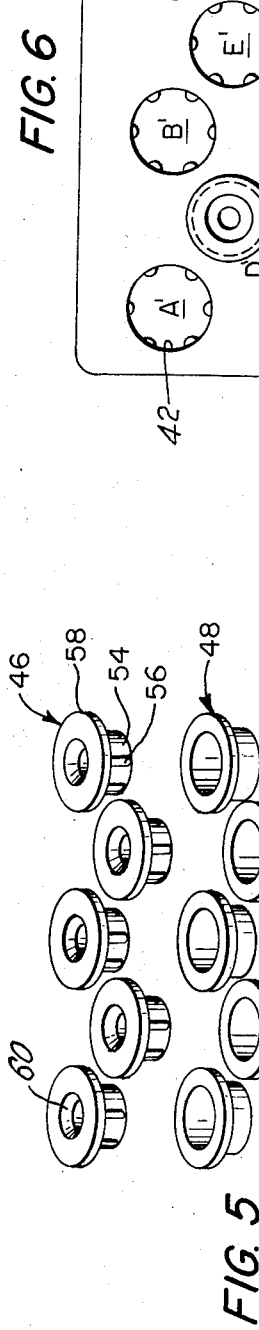
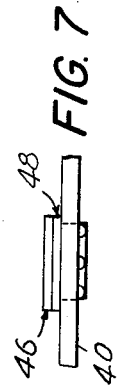
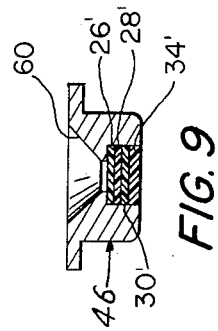
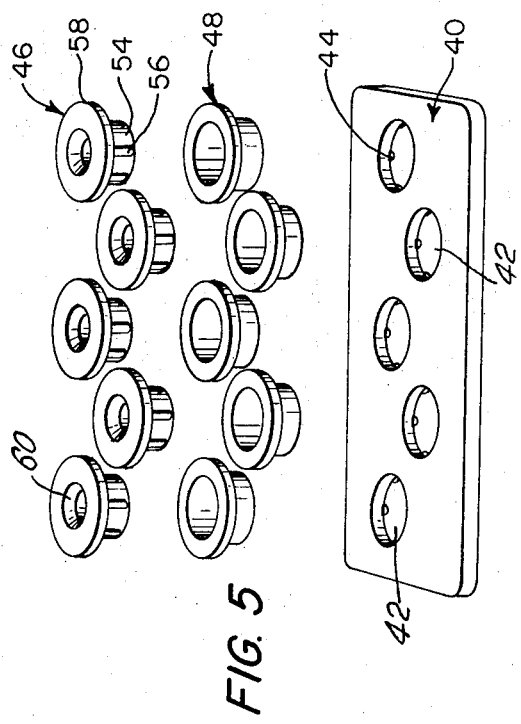
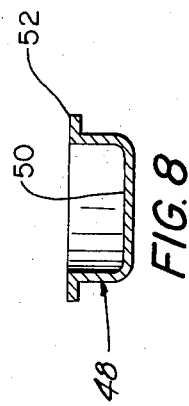

3,806,422
SCREENING TEST APPARATUS FOR ENZYME
ACTIVITY IN BLOOD AND BIOLOGICAL FLUIDS
Rudolph H. Moyer, West Covina, and Donald J. Sibbett, Cucamonga, Calif., and Gerald F. Binnings, Port Townsend, Wash., assignors to Geomet, Incorporated, Rockville, Md.
Filed Jan. 24, 1972, Ser. No. 219,949
Int. Cl. C12k 1/00
U.S. Cl. 195—103.5 R    5 Claims

ABSTRACT OF THE DISCLOSURE

Method and apparatus for conducting screening tests for enzyme activity in blood and biological fluids utilizing completely self-contained disposable cassettes for semi-quantitative estimation of enzyme levels in blood and other biological fluids. The cassettes contain premeasured quantities of all reagents necessary to conduct a given enzyme assay, along with a series of controls which react concurrently with the sample being measured.

BACKGROUND OF THE INVENTION

Measurement of enzyme activity in various body fluids has become a routine facet of clinical diagnosis. In practice, the activity level of certain enzymes is significant, both in confirming diagnoses and in prescribing treatment for various disorders. The number of enzymes which may be used as indicators is relatively large and the afflictions to which each pertains are well known to those skilled in the art. The present invention relates specifically to that group of enzymes whose activity may be measured by means of reduction of the pyridine nucleotide co-enzymes. This measurement may be either direct, as in the case of Lactate Dehydrogenase (LDH), or indirect, as in assay of Creatine Phosphokinase (CPK).

In the most convenient methods for assay of enzyme systems coupled to oxidation or reduction of pryidine nucleotide coenzymes, the rate of change in oxidation state of the coenzyme is measured spectrophotometrically. The manipulations and equipment required for such assays are well known to those skilled in the art. Despite the convenience of commercially available kits designed for single assays, a number of manipulations must still be carried out by skilled technicians with access to laboratory facilities and specific equipment. In the assay of an enzyme in blood, the serum is first separated from the formed elements (red cells, platelets, etc.) of the sample. An accurately measured aliquot is then added to a thermostatted reaction mixture, which may require further incubation prior to measurement of absorbance changes. The absorbance measurement, itself, requires precise temperature control, accurate timing and careful interpretation. Though automated equipment is available to facilitate many of these manipulations, such equipment is expensive and designed primarily for performance of repetitive tests rather than the immediate single measurements required in emergency situations.

In many cases, an attending physician requires a rapid, qualitative indication of a blood enzyme level rather than absolute quantitation. With present clinical practice, the results of an enzyme assay can be available within an hour of the time a sample is transported to a laboratory. Such a rapid response, however, occurs only in ideal circumstances, with a delay of several hours being more usual. Since patient treatment in emergencies must frequently be initiated within minutes, present enzymes assay procedures merely serve to confirm diagnoses upon which prior action has been taken rather than as diagnostic aids at the moments of decision. Thus, there is a need for rapid tests which provide semi-quantitative indications of enzyme levels in a short enough time to be of assistance in arriving at diagnoses in emergency situations.

SUMMARY OF THE INVENTION

The present invention relates to extensions and improvements of the concepts and principles disclosed in copending applications: Ser. No. 63,842, now U.S. Pat. No. 3,663,374, entitled "Methods and Apparatus for Quantitating Enzyme Activity" filed Aug. 14, 1970, Ser. No. 110,185 "Improved Methods and Apparatus for Assaying Enzyme Activity" filed Jan. 27, 1971 and Ser. No. 118,903, entitled "Rapid Methods for Assay of Enzyme Substrates and Metabolites" filed Feb. 25, 1971, all assigned to a common assignee herewith. The object of these inventions is to provide completely self-contained, disposable cassettes for semi-quantitative estimation of enzyme levels in blood and other biological fluids.

The cassettes contain premeasured quantities of all the reagents necessary to conduct a given enzyme assay, along with a series of controls which react concurrently with the sample being measured. The reagents are freeze-dried on discs of absorbent material arranged in unique structures, each of which provides the combined functions of prefilter, and reaction zone. The filtration system is such that even delicate fluids containing high particle levels, such as whole blood, provide clear filtrates for assay. Combination of the filtration system with controls makes each cassette a completely self-contained unit free from the usual requirements for volume measurement, temperature control, operator training, laboratory facilities or instrumentation. The only requirement is that a few drops of a sample such as whole blood be applied to designated sites and several drops of pure water to other sites to provide a semi-quantitative estimate of an enzyme level within approximately ten minutes after the start of a test.

Illustrative embodiments of apparatus and working embodiments of practical methods of the invention will be explained with reference to the accompanying drawings in which:

FIG. 5 is an exploded perspective view of an alternate format in which each test spot is assembled individually and then positioned in a display card;

FIG. 6 is a plan view partly assembled, of the embodiment of FIG. 5;

FIG. 7 is a fragmentary sectional view through a test spot assembly of FIG. 6;

FIG. 8 is a sectional view through a window portion of the assembly of FIG. 7; and FIG. 9 is a sectional view through a barrel portion of the assembly of FIG. 7.

Figure 1:
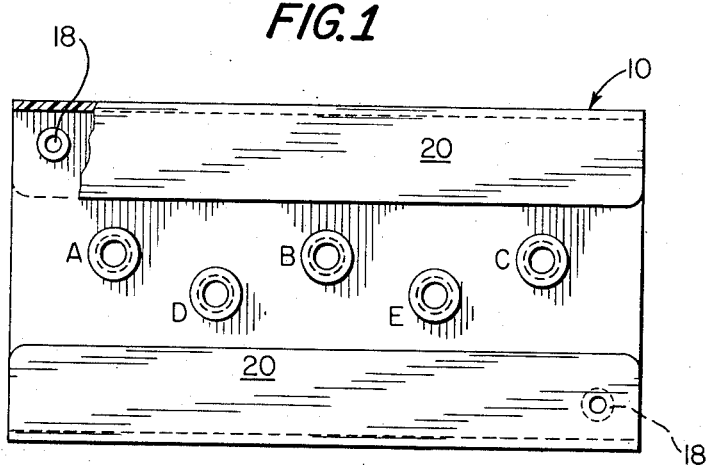
FIG. 1 is a plan view of a format suitable for comparison between rate of color development on reference spots and on a test spot.
Figure 2:
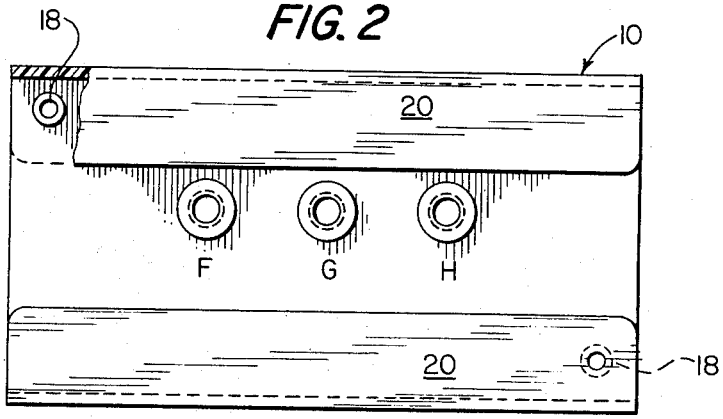
FIG. 2 is a plan view of a simplified format also suitable for comparison between rate of color development on reference spots and on a test spot.
Figure 3:
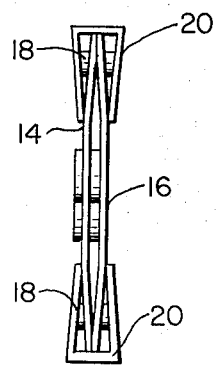
FIG. 3 is an end elevational view of the structure of FIGS. 1 and 2.

Referring now in more detail to the drawings, the format of FIG. 1 is designed for comparison of the rate of color development on a test spot with that on three graded reference spots. A blank spot is included to detect abnormal conditions of a sample which could invalidate a test. The format of FIG. 2 is a simplification of that in FIG. 1 and is designed for comparison of the rate of color development on a test spot with that on two graded reference spots. The test cassette is generally designated 1 and includes thereon a plurality of test spot areas A, B, C, D and E. Spots A, B, and C contain controls, as will appear hereinafter, representing normal, borderline and elevated enzyme levels, respectively. Spot D is a blank and Spot E is for assay of the test specimen and contains all reagents. The design in FIG. 2 contains a test spot G and two reference spots, F and H, representing normal and elevated enzyme levels respectively. In either case, alteration of the number of spots or their relative positions can be appropriate as desired.

Figure 4:
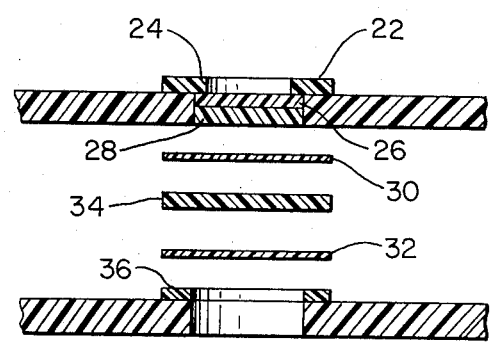
FIG. 4 is a fragmentary enlarged exploded view of a stacked or assembled array of the components of a test spot of FIGS. 1 and 2.

The cassette 10 consists of two slides, 14, 16 of appropriate dimensions and preferably are of high impact, opaque polystyrene sheets. The sheets or slides, as assembled, are fastened by corner eyelets 18, and plastic spring clamps 20 are used to cover the edges of the assembly. The spring clamps maintain effective seals between various of the components, such as the retaining rings and absorbent glass fiber discs on which required reagents are impregnated. The spot test format components and arrangement are shown in FIG. 4. Item 22 is a high-impact, circular polystyrene retaining ring of ¼ inch diameter with a ⅛ inch hole in its center. This ring which may be made from clear plastic of 0.015 inch thickness, is sealed to the upper side of an opaque, white, high-impact polystyrene slide 14 measuring 1⅝ inches by 3¼ inches. A 0.161 inch diameter hole 24 in the upper slide 14 is filled with two discs of glass fiber padding (Whatman GF/A glass fiber paper has been successfully used), which are designated at 26 and 28. These absorbent discs are retained in the hole during preparation of the assembly by sealing membranes 30 such as microporous filters onto the bottom of the upper slide. For use with whole blood, 0.6 micron Nuclepore (General Electric Company) has been found appropriate. Another absorbent disc 34 is placed between the membrane 30 and the window 32. Its function is to assist in drawing liquid through the membrane 30, to serve as reaction volume, as do discs 26 and 28, and to distribute the reacting liquid mixture uniformly across the viewing window 32. The viewing window 32 may be utilized as the reservoir for indicator dyes and enzymes. These are deposited in solution and freeze-dried on its upper surface. When the liquid reaction mixture diffuses through the assembly associated with the upper slide, color is developed at the interface between disc 34 and window 32. The bottom slide may be sealed to another lower ring 36 such as the upper retainer 22. The window 32 may be either a clear impermeable plastic or a transparent film such as Nuclepore (General Electric Company) sealed across the lower ring 36. Use of the permeable film, or small vent holes in the window, avoids the formation of bubbles at the interface between members 34 and 32. Bubbles in this position may make color development uneven and difficult to accurately compare. The lower ring 36 and the plastic spring edge binders 20 and corner eyelets 18 serve to maintain the integrity of the liquid seal in all parts of each single spot assembly. The two slides 14, 16 are sealed together in a dry atmosphere (<5% relative humidity) and stored in gas-tight envelopes.

A modified assembly designed for automated production of the cassettes is shown in FIGS. 5–9 inclusive. In this embodiment the cassette includes a pre-labeled card 40 of any suitable material having a plurality of holes 42 therethrough and which are provided with protuberances at 44. The number of holes or openings 42 is determined by, and equal to, the number of test spots to be provided on the completed cassette. In the shown embodiment test spots A', B', C', D', and E' are used corresponding with the test spots A–E of FIG. 1.

Each test spot consists of a barrel section 46 (FIG. 9) and a window section 48 (FIG. 8). Window section 48 has a closed bottom 50 and a flange or ring 52 at its top. The circumference of the body portion of window 48 is commensurate with the diameter of holes 42 and adapted for engagement therein in a frictional manner. Barrels 46 include a body portion 54 having lugs 56 thereon and an upper rim or flange 58. The diameter of the barrel body portion 54 is commensurate with the internal dimension of the window portion and adapted for engagement therein in assembled relationship with lugs 56 frictionally engaging therein. The body portion 54 has a truncated conical opening 60, FIGS. 5 and 9, which serves as a funnel or directing opening for test medial to be applied to the individual test units or discs.

Each test spot therefore consists of a barrel section containing a filtration system and a transparent window section. Both barrels and windows are injection molded from appropriate plastics such as polyethylene, polystyrene or cellulose acetate. The barrels and windows, having appropriate mating and compatible dimensions are pressed together to form capsules which are then fastened to the appropriate positions on the pre-labeled cards to form the finished cassettes. Preparation of each barrel/window combination can be effected by appropriate automated equipment and the following operations further described and delineate the various components and method of assembly.

(A) Barrels (1) Barrels 46 are loaded into a classifier which orients them to the correct position and feeds them into a step-wheel.

(2) The step-wheel moves the barrel to a second position where glass fiber filters 26', and 28', corresponding to 26 and 28, are punched from tape stock and inserted into a position inside and at the lower end of the barrel.

(3) The wheel moves the barrel to a third position where a membrane filter 30' corresponding to 30 is punched from tape stock and inserted into a position in contact with the glass fiber filters already present.

(4) The wheel moves the barrel to a fourth position where 20 microliters of dye solution is applied, followed immediately by 15 microliters of the appropriate reaction mixture or blank solution.

(5) The wheel moves the barrel to a fifth position where the central absorbent pad 34' corresponding to 34, is punched from tape stock and applied to the membrane to take up excess reagent.

(6) The wheel moves the assembled barrel to a sixth position where it is inverted and inserted into a window 48 to form a capsule.

(B) Windows (1) Windows 48 are loaded into a classifier which orients them to the correct position and feeds them into a step-wheel.

(2) The wheel moves to a second position where the apropriate enzyme controls are applied to the inside and center of the window.

(3) The wheel moves to a third position where barrels 46 are inserted to form a capsule.

The capsules are fed into a freezing tray, each of which accommodates sufficient capsules for one cassette and keeps them arranged in proper order for assembly on the cards. The frozen capsules are dried in a high vacuum and then unloaded into a classifier which orients them appropriately and presses them into pre-labeled cards. The resulting cassettes are packaged in vapor-tight envelopes and are ready for use. All operations subsequent to freeze-drying, take place in an atmosphere having less than 5 percent relative humidity.

The reagent systems utilized are similar to those routinely employed in assays of enzyme systems which are coupled to pyridine nucleotide coenzymes. However, visible dyes and electron carriers are included in the reagents of the screening test to provide visual estimates of reaction rates. Any of a number of oxidation-reduction indicators, including various tetrazoles, indophenols and resazurin may be used with several electron carriers. The optimal combination of indicator and carrier is dependent on the requirements of the enzyme system tested. In many cases, several combinations are appropriate and selection can be on the basis of individual preference. Concentrations of reagents and their respective locations in the spot structure are adjusted to provide optimum reaction conditions when the freeze-dried components are reconstituted by wetting the spots. The following examples illustrate the utility of the method:

EXAMPLE 1

Acetate dehydrogenase

The reaction sequence employed in the screening test is:

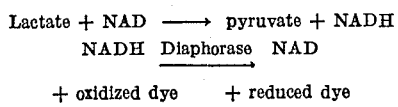

where:

NAD = nicotinamide-adenine dinucleotide
NADH = reduced nicotinamide-adenine dinucleotide
Dye = 2,6-dichlorophenol indophenol

[resazurin, nitroblue tetrazoleum and iodonitri tetrazoleum have also been used as the dye in this system].

The reagents are prepared and dispensed in the following manner:

Dye solution:
2,6-dichlorophenol indophenol _____ mg./ml__ 0.3
Haparin _____ units/ml__ 60
Serum albumin _____ mg./ml__ 10

The solution is prepared in distilled H₂O and 10 microliters per spot applied to the prefilters (items 26 and 28, FIG. 4).

Reagent mixture:
Serum albumin _____ mg./ml__ 10
NAD _____ mM__ 7
Lithum lactate _____ mM__ 100
Diaphorase _____ units/ml__ 3

The solution is prepared in 0.1 M phosphate buffer (pH 7.4) and 15 microliters applied to the central pad (item 34, FIG. 4) of each of spots A, B, C and E. Spot D is a blank and receives a similar solution from which Lithum lactate has been omitted. If the format in FIG. 2 is used, 15 microliters of the complete reaction mixture is applied to each of spots F, G and H Controls: Lactate dehydrogenase is diluted as required in 0.05 M phosphate buffer (pH 7.4) containing 10 mg./ml. dextran (200,000–300,000 M.W.) and five microliters of the appropriate dilutions applied to the transparent windows (item 32, FIG. 4) of spots A, B and C. If the format in FIG. 2 is used, the controls are applied to spots F and H.

In the usual procedure, slide member 14 is assembled complete with members 22, 24, 26, 28 and 30. The dye solution is applied and followed immediately by the reagent and blank solution. Member 34 is then added to absorb excess reagent and the assembly immediately frozen. Slide 16, assembled to contain members 32 and 36, is placed on a freezing surface. The control solutions are then spread evenly on the upper surface of member 32. The two frozen components may be assembled into the final structure, 10, at this stage and then dried in a high vacuum. If desired, they may be dried separately and then assembled. Regardless of the assembly method, all steps subsequent to drying must be carried out in an atmosphere having less than five percent relative humidity.

In conducting a test, the cassette is positioned with the retaining ring, item 22, uppermost. A drop of water is applied to spots A, B and C and a drop of sample (whole blood may be used) to each of D and E. If the format in FIG. 2 is used, sample is applied to G and water to F and H. Volumes need not be measured since fluid uptake is controlled by the wells and absorbent pads. After application of the fluids, the cassette is inverted and the color changes observed. Units prepared with 2,6-dichlorophenol indophenol as indicator, show a disappearance of blue color whose rate is proportional to enzyme activity. Matching the intensity of color of the test spot with that on the controls provides a direct indication of LDH level. With the dye concentration indicated in this example, optimum comparisons, for samples with LDH levels in the range of clinical interest, are obtained after five to ten minutes of reaction.

EXAMPLE 2

α-Hydroxybutyrate dehydrogenase (HBD)

The reaction sequence is similar to that for LDH except that α-hydroxybutyrate is substituted for lactate and LDH-Fraction I (from heart muscle) is used for the controls.

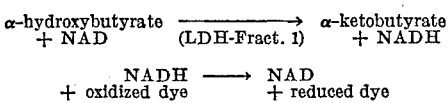

The selection of dyes indicated for LDH is also appropriate for HBD. The reagents are prepared and dispensed as indicated in Example 1, with 100 mM. α-hydroxybutyrate substituted for lactate. Controls are prepared with LDH derived from heart muscle and assayed for LBD activity, for adjustment of settings.

EXAMPLE 3

Glyceraldehyde-3-phosphate dehydrogenase (GAPD)

The reaction sequence utilized is:

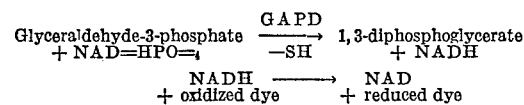

Resazurin and nitroblue tetrazoleum are examples of indicators appropriate for screening this enzyme. Resazurin is somewhat preferable because it is less subject to chemical reaction with thiol. In the reaction mixture, arsenate is substituted for phosphate to allow spontaneous decomposition of the reaction product and regeneration of the GAPD substrate. The following solutions are prepared and distributed as described in Example 1:

Dye solution
Resazurin _____ mg./ml__ 0.3
Haparin _____ units/ml__ 60
Serum albumin _____ mg./ml__ 10
Reaction mixture
Glyceraldehyde-3-phosphate ____ mM__ 10
Arsenate _____ mM__ 10
Dithiothreitol _____ mM__ 5
Diaphorase _____ units/ml__ 3
Serum albumin _____ mg./ml__ 10

Glyceraldehyde-3-phosphate is prepared by hydrolysis of the diethyl acetal and adjusted to pH 7.5 prior to addition of the other reagents. Final pH of the mixture is adjusted to 7.5. The blank solution consists of the above reaction mixture with glyceraldehyde - 3 - phosphate omitted.

Controls: Dilution of GAPD is in 0.05 M tris buffer (pH 7.5) containing 10 mg./ml. dextran.

Use of the cassettes is as described in Example 1. With resazurin as indicator, the color change observed is from blue to red. GAPD activity is proportional to the rate of change and optimum color comparisons are obtained after approximately five minutes of reaction.

EXAMPLE 4

Creatine phosphokinase (CPK)

The reaction sequence utilized is:

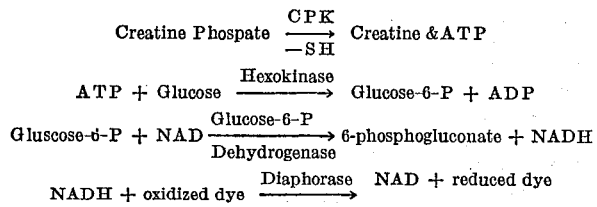

As in Example 3, less chemical interaction between the dye and thiol occurs with resazurin than with most of the tetrazoles, though some of the latter have been used as indicators in this system.

The following solutions are prepared as indicated below and dispensed as described for the system in Example 1.

Dye solution:
- Resazurin _____ mg./ml __ 0.3
- Serum albumin _____ mg./ml __ 10.0
- Heparin _____ units/ml __ 60

Reaction mixture:
- Creatine phosphate _____ mM __ 35
- NAD _____ mM __ 7
- AMP _____ mM __ 40
- Glucose _____ mM __ 50
- Magnesium acetate _____ mM __ 5
- ADP _____ mM __ 6
- Dithiothreitol _____ mM __ 10
- Serum albumin _____ mg./ml __ 5
- Diaphorase _____ units/ml __ 6
- Hexokinase _____ units/ml __ 0.2
- Glucose-6-phosphate dehydrogenase
   units/ml __ 3

The chemical components of the mixture are dissolved in $H_2O$ and adjusted to pH 6.75 prior to addition of the enzymes. The blank solution consists of the same mixture with Creatine phosphate omitted. The inclusion of AMP is for the purpose of inhibition of Myokinase, a muscle enzyme which reacts with ADP to produce some ATP and would thus result in a false reaction. The Glucose-6-phosphate dehydrogenase used, is derived from bacterial sources and can utilize NAD as coenzyme. This permits a diaphorase to be used as the electron carrier and results in less chemical dye reduction than would occur if carriers reducible by the thiol were employed.

Controls: Appropriate dilutions of CPK are made in 0.05 M glycylglycine buffer (pH 6.75) containing 10 mg./ml. dextran.

The above examples illustrate the general utility of the method. Any enzyme system which can be coupled to reduction of the pyridine nucleotide coenzymes can likewise be coupled to a dye system for assay by means of the visual screening test described.

The structure and use of the present invention will be apparent from the foregoing. Manifestly, minor changes and minor variations can be effected without departing from the spirit and scope of the invention as defined in and limited solely by the appended claims.

We claim:

1. In a screening test apparatus for enzyme activity in blood and biological fluids utilizing a test array system:
   (A) a support;
   (B) said support having a plurality of spaced holes;
   (C) inserts constituting separate restricted test zone areas frictionally engaged in respective ones of said spaced holes, each including:
      (i) a barrel section open at both ends;
      (ii) a plurality of discs superposed in a stack mounted and confined in said open ended barrel section;
      (iii) said discs respectively containing dry test reagents and dyes reactable when a fluid test specimen is placed on a said stack to develop a visual indication of enzyme activity in the tested fluid; and
      (iv) a transparent window section open at one end and having an enzyme control medium on its inner surface, said window section having said barrel section inserted therein, and in assembled relationship, said window section and said barrel section forming a said insert with the window section engageable in a said hole.

2. In apparatus as claimed in claim 1, wherein said discs are respectively impregnated with in situ freeze-dried reagents.

3. In apparatus as claimed in claim 1, said barrel section including a cylindrical body portion and longitudinally extending lugs thereon frictionally engaged in the interior of said window section.

4. In apparatus as claimed in claim 3, said body portion having a truncated conical shaped opening to facilitate introduction of a fluid test specimen.

5. In apparatus as claimed in claim 3, said holes having protuberances on the inner surfaces thereof, said window section being frictionally engaged in said holes with said protuberances.

References Cited
UNITED STATES PATENTS

| | | | |
|---|---|---|---|
| 3,526,480 | 12/1966 | Findl et al. | 23—253 |
| 3,367,841 | 2/1968 | Buissiere et al. | 195—103.5 R |
| 3,663,374 | 5/1972 | Moyer et al. | 195—103.5 R |

DAVID M. NAFF, Primary Examiner

U.S. Cl. X.R.

23—230 B, 25 CTP; 195—103.5 R